United States Patent
Hoshino

(10) Patent No.: US 10,374,736 B2
(45) Date of Patent: Aug. 6, 2019

(54) SLAVE DEVICE, SERIAL COMMUNICATIONS SYSTEM, AND COMMUNICATION METHOD FOR SERIAL COMMUNICATIONS SYSTEM

(71) Applicant: FANUC CORPORATION, Yamanashi (JP)

(72) Inventor: Eijirou Hoshino, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/924,662

(22) Filed: Mar. 19, 2018

(65) Prior Publication Data
US 2018/0278352 A1  Sep. 27, 2018

(30) Foreign Application Priority Data
Mar. 21, 2017  (JP) ................................ 2017-054040

(51) Int. Cl.
*H04J 3/06* (2006.01)

(52) U.S. Cl.
CPC .................. *H04J 3/0673* (2013.01)

(58) Field of Classification Search
CPC .................................................... H04J 3/0673
See application file for complete search history.

(56) References Cited

U.S. PATENT DOCUMENTS

| | | | |
|---|---|---|---|
| 5,990,638 A | 11/1999 | Aoyama et al. | |
| 9,760,114 B1* | 9/2017 | Gopalakrishnan | ........ G06F 1/12 |
| 2002/0012342 A1 | 1/2002 | Oldfield et al. | |
| 2005/0007998 A1* | 1/2005 | Van Der Wal | .......... H04L 47/10 370/352 |
| 2013/0039220 A1* | 2/2013 | Ruffini | .................. H04J 3/0641 370/255 |
| 2013/0077509 A1* | 3/2013 | Hirota | ..................... H04L 47/56 370/252 |
| 2013/0177015 A1* | 7/2013 | House | .................. H04J 3/0605 370/389 |
| 2013/0282941 A1* | 10/2013 | van Dijk | ............... H04L 12/403 710/110 |

(Continued)

FOREIGN PATENT DOCUMENTS

| | | |
|---|---|---|
| CN | 101018115 A | 8/2007 |
| CN | 101488825 A | 7/2009 |

(Continued)

OTHER PUBLICATIONS

English Abstract and Machine Translation for Japanese Publication No. 2002-247059 A, published Aug. 30, 2002, 26 pgs.

(Continued)

*Primary Examiner* — Jason E Mattis
(74) *Attorney, Agent, or Firm* — Fredrikson & Byron, P.A.

(57) ABSTRACT

A slave device is equipped with a communications circuit that carries out serial communications in a communication mode in which received data is transmitted in synchronism with its own clock pulse signal, a communications line that carries out serial communications in a pass through mode in which received data is directly transmitted without depending on its own clock pulse signal, a switching unit that switches from the communication mode to the pass through mode, and a control unit that controls the switching unit.

14 Claims, 6 Drawing Sheets

(56) References Cited

U.S. PATENT DOCUMENTS

2014/0089542 A1* 3/2014 Petillon .................. H04L 12/42
 710/105
2015/0295829 A1* 10/2015 Palmhager ............ G06F 13/385
 709/217

FOREIGN PATENT DOCUMENTS

| CN | 205283576 U | 6/2016 |
|---|---|---|
| CN | 205490577 U | 8/2016 |
| JP | 191547 A | 4/1989 |
| JP | 9218848 A | 8/1997 |
| JP | 1013394 A | 1/1998 |
| JP | 10285198 A | 10/1998 |
| JP | 11205392 A | 7/1999 |
| JP | 200040039 A | 2/2000 |
| JP | 2002247059 A | 8/2002 |
| JP | 2004227261 A | 8/2004 |
| JP | 2017212593 A | 11/2017 |
| WO | 2017204174 A1 | 11/2017 |

OTHER PUBLICATIONS

English Abstract for Japanese Publication No. 2017-212593 A, published Nov. 30, 2017, 1 pg.
English Abstract and Machine Translation for Japanese Publication No. 2000-040039 A, published Feb. 8, 2000, 20 pgs.
English Abstract for Japanese Publication No. JPH10-285198 A, published Oct. 23, 1998, 2 pgs.
English Abstract and Machine Translation for Japanese Publication No. 2004-227261 A, published Aug. 12, 2004, 23 pgs.
English Abstract and Machine Translation for Japanese Publication No. 11-205392 A, published Jul. 30, 1999, 7 pgs.
English Abstract for Japanese Publication No. JPH1013394 A, published Jan. 16, 1998, 1 pg.
English Abstract and Machine Translation for Japanese Publication No. 09-218848 A, published Aug. 19, 1997, 7 pgs.
English Abstract and Machine Translation for Japanese Publication No. 01-091547 A, published Apr. 11, 1989, 6 pgs.
English Abstract and Machine Translation for Chinese Publication No. 205283576 U, published Jun. 1, 2016, 13 pgs.
English Abstract and partial Machine Translation from Office Action issued in related Chinese Application No. 201810236918.4 re Chinese Publication No. 205490577 U, published Aug. 17, 2016, 9 pgs.
English Abstract and Machine Translation for Chinese Publication No. 101488825 A, published Jul. 22, 2009, 14 pgs.
English Abstract and Machine Translation for Chinese Publication No. 101018115 A, published Aug. 15, 2007, 21 pgs.
Untranslated Decision to Grant a Patent mailed by Japan Patent Office (JPO) for Application No. JP 2017-054040, dated Aug. 21, 2018, 3 pages.
English Machine Translation of Decision to Grant a Patent mailed by Japan Patent Office (JPO) for Application No. JP 2017-054040, dated Aug. 21, 2018, 3 pages.
Untranslated Notification of Reasons for Refusal mailed by Japan Patent Office (JPO) for Application No. JP 2017-054040, dated Jul. 3, 2018, 3 pages.
English Machine Translation of Notification of Reasons for Refusal mailed by Japan Patent Office (JPO) for Application No. JP 2017-054040, dated Jul. 3, 2018, 3 pages.

* cited by examiner

SLAVE DEVICE, SERIAL COMMUNICATIONS SYSTEM, AND COMMUNICATION METHOD FOR SERIAL COMMUNICATIONS SYSTEM

CROSS-REFERENCE TO RELATED APPLICATION

This application is based upon and claims the benefit of priority from Japanese Patent Application No. 2017-054040 filed on Mar. 21, 2017, the contents of which are incorporated herein by reference.

BACKGROUND OF THE INVENTION

Field of the Invention

The present invention relates to a slave device connected in a daisy chain fashion to a master device, a serial communications system including a plurality of slave devices connected in a daisy chain fashion to the master device, and a communication method for such a serial communications system.

Description of the Related Art

In the case that a plurality of servo amplifiers (slave devices) are connected to a CNC (computer numerical control) device (master device) in a daisy chain fashion, in order to move each of respective axes that are controlled by respective servo amplifiers in synchronism with each other, it is essential for the CNC device and the respective servo amplifiers to be synchronized with each other. For this purpose, Japanese Laid-Open Patent Publication No. 10-013394 discloses a method of synchronizing communications in which the timings of a master device and slave devices are synchronized.

SUMMARY OF THE INVENTION

In such a daisy chain type serial communications system, when serial communications are carried out between the master device and a slave device that serves as a communications target (hereinafter referred to as a specified slave device), data transmitted from the master device passes through the plurality of slave devices that exist therebetween, and arrives at the specified slave device. The data received by the specified slave device arrives at the specified slave device while being delayed by a time obtained by summing the delay times in each of the slave devices that exist between the master device and the specified slave device. Consequently, if the delay time of the data that arrives at the specified slave device is known, the timing thereof can be synchronized between the master device and the specified slave device.

In a time synchronization function according to IEEE 1588, time synchronization signals are sent between the master device and the specified slave device, and a time difference is measured. At this time, since it is not possible to measure time in units smaller than one period (one clock pulse) of a communication clock pulse signal, for example, an error lying within one clock pulse occurs in the phase difference measured between the master device and a slave device adjacent to the master device. Consequently, if a plurality of slave devices are interposed between the master device and the specified slave device, the errors lying within one clock pulse are accumulated correspondingly. For example, in the event that three slave devices are interposed between the master device and the specified slave device, an error of four clock pulses (four periods of a communication clock pulse signal) occurs in the phase difference between the master device and the specified slave device.

Thus, the present invention has the object of providing a slave device, a serial communications system, and a communication method for a serial communications system, in which phase difference errors, which occur when time synchronization is carried out between a master device and a slave device that is not adjacent to the master device, are reduced.

A first aspect of the present invention is characterized by a slave device connected in a daisy chain fashion with a master device, and which is equipped with a communications circuit configured to carry out serial communications in a communication mode in which received data is transmitted in synchronism with its own clock pulse signal, the slave device further including a communications line configured to carry out serial communications in a pass through mode in which the received data is directly transmitted without depending on its own clock pulse signal, a switching unit configured to switch from the communication mode to the pass through mode, and a control unit configured to control the switching unit.

A second aspect of the present invention is characterized by a serial communications system equipped with a master device and a plurality of slave devices connected in a daisy chain fashion with the master device, wherein the master device transmits, to a slave device that is connected to a subsequent stage, synchronization request data including request information for requesting time synchronization, and slave device information indicating a slave device for which time synchronization is desired, each of the slave devices includes a communications circuit configured to carry out serial communications in a communication mode in which received data is transmitted in synchronism with its own clock pulse signal, a communications line configured to carry out serial communications in a pass through mode in which the received data is directly transmitted without depending on its own clock pulse signal, a switching unit configured to switch from the communication mode to the pass through mode, and a control unit configured to control the switching unit, wherein, in the case that the received data from the master device is the synchronization request data, and the slave device information contained within the synchronization request data indicates a slave device other than itself, the control unit, after having transmitted the received synchronization request data in the communication mode, controls the switching unit to switch from the communication mode to the pass through mode.

A third aspect of the present invention is characterized by a communication method for a serial communications system equipped with a master device and a plurality of slave devices connected in a daisy chain fashion with the master device, wherein each of the slave devices includes a communications circuit configured to carry out serial communications in a communication mode in which received data is transmitted in synchronism with its own clock pulse signal, a communications line configured to carry out serial communications in a pass through mode in which the received data is directly transmitted without depending on its own clock pulse signal, and a switching unit configured to switch from the communication mode to the pass through mode, the communication method including a synchronization requesting step in which the master device transmits, to a slave device that is connected to a subsequent stage, synchronization request data including request information for requesting time synchronization, and slave device information indicating a slave device for which time synchronization is desired, and a pass through step in which, in the case that the received data from the master device is the synchronization request data, and the slave device information contained within the synchronization request data indicates a slave device other than itself, the slave device, after having transmitted the received synchronization request data in the communication mode, controls the switching unit to switch from the communication mode to the pass through mode.

According to the present invention, it is possible to set slave devices, which are interposed between the master device and a slave device for which time synchronization with the master device is carried out, in a pass through mode. In accordance with this feature, the intervening slave devices are placed in a state of being substantially non-existent, and thus errors due to the intervening slave devices are not accumulated. Consequently, it is possible to reduce phase difference errors that are generated when time synchronization is carried out, as well as to perform the time synchronization control with high accuracy.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A slave device, a serial communications system, and a communication method for a serial communications system according to the present invention will be presented and described in detail below with reference to the accompanying drawings.

Figure 1:
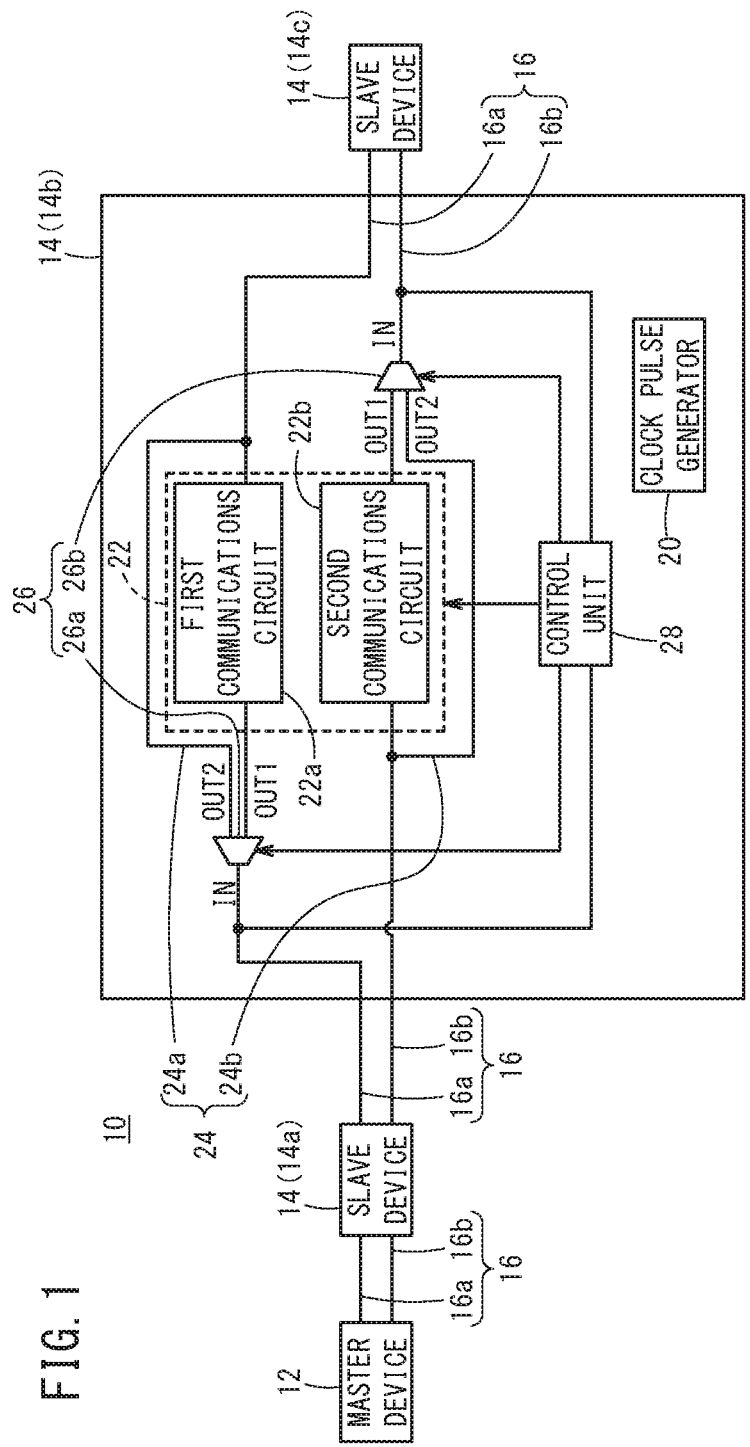
FIG. 1 is a diagram showing a configuration of a serial communications system according to an embodiment of the present invention.

FIG. 1 is a diagram showing the configuration of a serial communications system 10 according to an embodiment of the present invention. The serial communications system 10 comprises a master device (for example, a numerical control device) 12, and a plurality of slave devices (serial communications units) 14 connected to the master device 12 in a daisy chain fashion. In FIG. 1, for facilitating description, an example is shown in which three slave devices 14 are connected in a daisy chain fashion.

The master device 12 and the three slave devices 14 are connected by signal lines 16. The signal lines 16 include a first signal line 16a and a second signal line 16b. The first signal line 16a is a signal line for transmitting data transmitted from the master device 12 to the slave devices 14, and the second signal line 16b is a signal line for transmitting data transmitted from the slave devices 14 to the master device 12.

The slave device 14 which is connected to a subsequent stage of the master device 12 may be referred to as a slave device 14a, the slave device 14 which is connected to a subsequent stage of the slave device 14a may be referred to as a slave device 14b, and the slave device 14 which is connected to a subsequent stage of the slave device 14b may be referred to as a slave device 14c.

Each of the slave devices 14 includes a clock pulse generator 20, a communications circuit 22, a communications line 24, a switching unit 26, and a control unit 28.

The clock pulse generator 20 generates or produces clock pulses having a communications rate. The communications circuit 22 is a circuit that carries out serial communications in a communication mode in which the received data is transmitted in synchronism with the clock pulses generated by the clock pulse generator 20 (hereinafter referred to as its own clock pulse signal). The communications line 24 is a signal line over which serial communications are carried out in a pass through mode in which the received data is directly transmitted without depending on its own clock pulse signal.

The switching unit 26 switches between carrying out serial communications in the communication mode, and carrying out serial communications in the pass through mode. When switching to the communication mode is performed by the switching unit 26, the received data is transmitted via the communications circuit 22, and when switching to the pass through mode is performed, the received data is transmitted via the communications line 24. During normal operation thereof, the slave devices 14 are set in the communication mode.

The control unit 28 controls the slave device 14 as a whole, and is constituted by a processor, a memory, and the like.

In the case that the received data is data transmitted from the master device 12 or the slave device 14 connected to the preceding stage via the first signal line 16a, the slave device 14 transmits the received data to the slave device 14 connected to the subsequent stage via the first signal line 16a. Further, in the case that the received data is data transmitted from the slave device 14 connected to the subsequent stage via the second signal line 16b, the slave device 14 transmits the received data to the master device 12 or to the slave device 14 connected to the preceding stage via the second signal line 16b.

For this purpose, the communications circuit 22 includes a first communications circuit 22a and a second communications circuit 22b. Each of the first communications circuit 22a and the second communications circuit 22b transmits the received data in the communication mode. The first communications circuit 22a is connected to a first signal line 16a by which its own slave device 14 and the master device 12 or the slave device 14 of the preceding stage are connected, and another first signal line 16a by which its own slave device 14 and the slave device 14 of the subsequent stage are connected. The second communications circuit 22b is connected to a second signal line 16b by which its own slave device 14 and the master device 12 or the slave device 14 of the preceding stage are connected, and another second signal line 16b by which its own slave device 14 and the slave device 14 of the subsequent stage are connected.

Using the communication mode, the first communications circuit 22a transmits the data transmitted from the master device 12 or the slave device 14 connected to the preceding stage to the slave device 14 connected to the subsequent stage. Using the communication mode, the second communications circuit 22b transmits the data transmitted from the slave device 14 connected to the subsequent stage to the master device 12 or the slave device 14 connected to the preceding stage. The first communications circuit 22a and the second communications circuit 22b include flip-flop circuits or the like.

Similarly, the communications line 24 includes a first communications line 24a and a second communications line 24b. Each of the first communications line 24a and the second communications line 24b transmit the received data in the pass through mode. The first communications line 24a is connected to the first signal line 16a by which its own slave device 14 and the master device 12 or the slave device 14 of the preceding stage are connected, and the other first signal line 16a by which its own slave device 14 and the slave device 14 of the subsequent stage are connected. The second communications line 24b is connected to the second signal line 16b by which its own slave device 14 and the master device 12 or the slave device 14 of the preceding stage are connected, and the other second signal line 16b by which its own slave device 14 and the slave device 14 of the subsequent stage are connected.

Using the pass through mode, the first communications line 24a transmits the data transmitted from the master device 12 or the slave device 14 connected to the preceding stage to the slave device 14 connected to the subsequent stage. Using the pass through mode, the second communications line 24b transmits the data transmitted from the slave device 14 connected to the subsequent stage to the master device 12 or the slave device 14 connected to the preceding stage. The first communications line 24a is connected in parallel with the first communications circuit 22a, and functions as a so-called bypass circuit of the first communications circuit 22a. The second communications line 24b is connected in parallel with the second communications circuit 22b, and functions as a so-called bypass circuit of the second communications circuit 22b.

Similarly, the switching unit 26 has a first switching unit 26a and a second switching unit 26b. The first switching unit 26a and the second switching unit 26b each include one input terminal IN and two output terminals OUT1, OUT2, and are constituted, for example, by multiplexers or the like.

The input terminal IN of the first switching unit 26a is connected to the first signal line 16a, which connects its own slave device 14 and the master device 12 or the slave device 14 of the preceding stage. The output terminal OUT1 of the first switching unit 26a is connected to the first communications circuit 22a, and the output terminal OUT2 of the first switching unit 26a is connected to the first communications line 24a. The input terminal IN of the second switching unit 26b is connected to the second signal line 16b, which connects its own slave device 14 and the slave device 14 of the subsequent stage. The output terminal OUT1 of the second switching unit 26b is connected to the second communications circuit 22b, and the output terminal OUT2 of the second switching unit 26b is connected to the second communications line 24b.

The first switching unit 26a switches between transmitting the data transmitted from the master device 12 or the slave device 14 connected to the preceding stage to the slave device 14 of the subsequent stage in the communication mode, and transmitting the same to the slave device 14 of the subsequent stage in the pass through mode. In other words, the first switching unit 26a switches between transmitting the received data via the first communications circuit 22a, and transmitting the received data via the first communications line 24a.

The second switching unit 26b switches between transmitting the data transmitted from the slave device 14 connected to the subsequent stage to the master device 12 or the slave device 14 of the preceding stage in the communication mode, and transmitting the same to the master device 12 or the slave device 14 of the preceding stage in the pass through mode. In other words, the second switching unit 26b switches between transmitting the received data via the second communications circuit 22b, and transmitting the received data via the second communications line 24b.

The control unit 28 carries out serial communications for the purpose of time synchronization with the master device 12. The control unit 28 detects the content of the data sent from the preceding stage via the first signal line 16a, and detects the content of the data sent from the subsequent stage via the second signal line 16b. The control unit 28 detects the data input to the input terminals IN of the first switching unit 26a and the second switching unit 26b. The control unit 28 controls the switching unit 26 (the first switching unit 26a and the second switching unit 26b). In accordance with the control of the switching unit 26 (the first switching unit 26a and the second switching unit 26b) by the control unit 28, switching is performed between transmitting the received data in the communication mode, and transmitting the received data in the pass through mode.

The master device 12 carries out serial communications for the purpose of performing time synchronization with the plurality of slave devices 14. The master device 12 performs time synchronization using a time synchronization function according to IEEE 1588. The master device 12 selects one of the slave devices 14 for which time synchronization is desired to be performed, and performs time synchronization with the selected slave device 14 (hereinafter referred to as a "synchronization target slave device 14S"). At this time, the slave devices 14 that are located between the master device 12 and the synchronization target slave device 14S carry out serial communications in the pass through mode. Owing to this feature, even in the case that a plurality of slave devices 14 exist between the master device 12 and the synchronization target slave device 14S, the intervening slave devices 14 do not transmit data corresponding to their own clock pulses, and therefore, the master device 12 and the synchronization target slave device 14S assume substantially the same state as that in which the other slave devices 14 are not interposed therebetween.

In this case, if the slave devices 14 interposed between the master device 12 and the synchronization target slave device 14S undergo a sudden change from the communication mode to the pass through mode, the serial communications which are already being performed by the slave devices 14 are interrupted. Thus, the slave devices 14 switch from the communication mode to the pass through mode only after the transmission of a specified unit of data, which is already being performed by the slave devices 14, is completed. In addition, when time synchronization between the master device 12 and the synchronization target slave device 14S is completed, the slave devices 14, which have been switched to the pass through mode, are switched back to the communication mode. Moreover, the specified unit of data is defined as a unit of data of serial communications as designated by hardware, or alternatively, is defined by a data delimiter (data collected over several packets, for example) designated by software.

Next, operations of the master device 12 and the plurality of slave devices 14 for the purpose of performing time synchronization will be described. First, a preparatory operation for performing time synchronization by the plurality of slave devices 14 will be described. Thereafter, a time synchronization operation carried out between the master device 12 and the synchronization target slave device 14S will be described. Next, a return operation of returning the slave devices 14, which have been set in the pass through mode, to the communication mode will be described. In the time synchronization operation, slave devices 14 that are interposed between the master device 12 and the synchronization target slave device 14S are set in the pass through mode.

<Preparatory Operation for Performing Time Synchronization>

Figure 2:
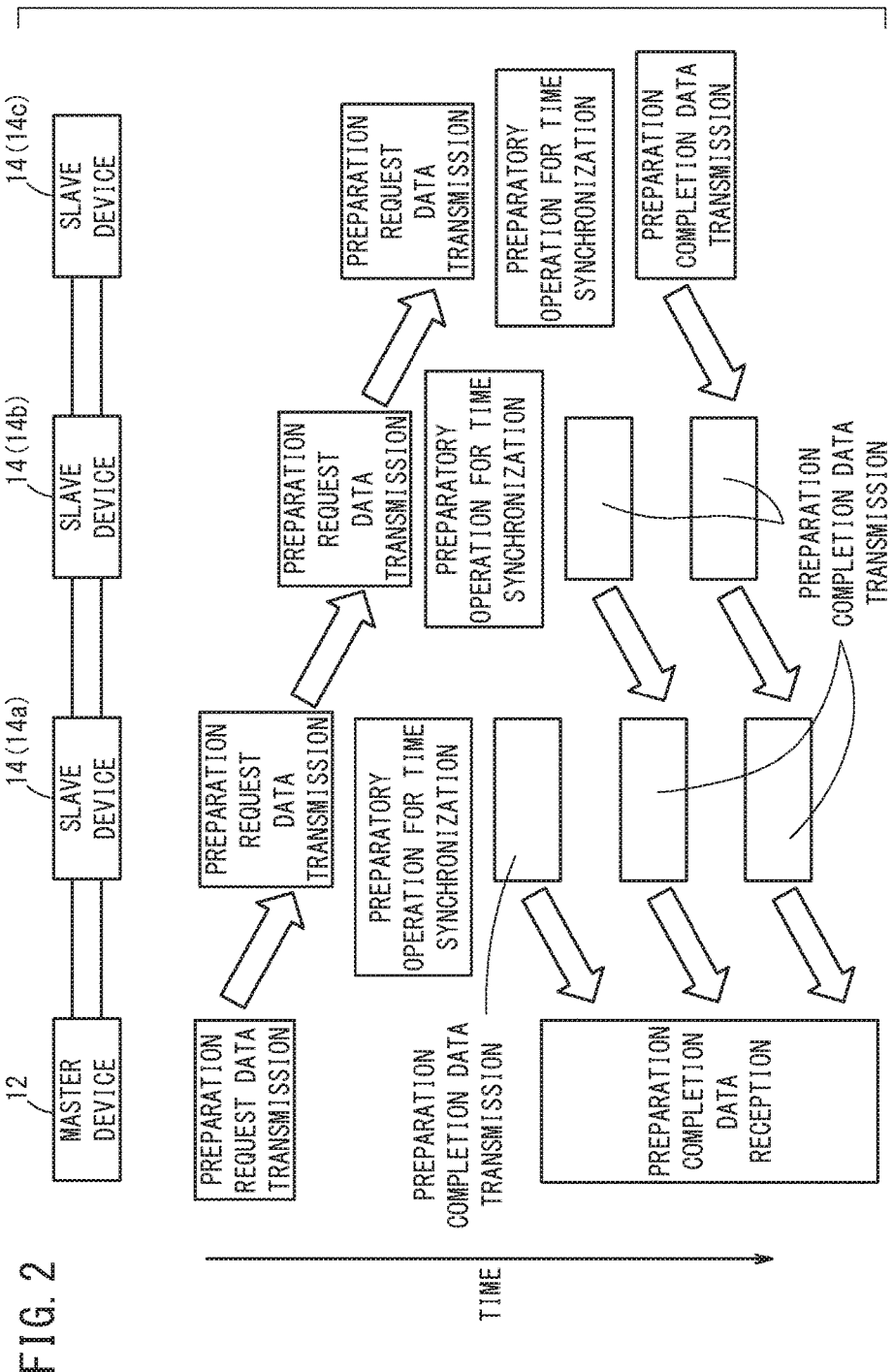
FIG. 2 is a time chart showing a preparatory operation for carrying out time synchronization by a plurality of slave devices.

Using the time chart shown in FIG. 2, a description will be given of a preparatory operation for carrying out time synchronization by the plurality of slave devices 14. Before time synchronization is carried out, the master device 12 transmits preparation request data to request preparation for time synchronization to the slave device 14a connected to the subsequent stage. Using the communication mode, the slave device 14a transmits the received preparation request data to the slave device 14b connected to the subsequent stage, together with performing the preparatory operation for time synchronization. The preparatory operation for time synchronization refers to transmitting the specified unit of data, which is currently being carried out by the slave device 14. Upon completion of the preparatory operation, or in other words, when transmission of the specified unit of data currently being carried out thereby is completed, the slave device 14a transmits preparation completion data to the master device 12 in the communication mode. Controls to detect the content of the received data, and to transmit the preparation completion data are performed by the control unit 28.

Using the communication mode, and upon receiving the preparation request data from the slave device 14a, the slave device 14b transmits the preparation request data to the slave device 14c connected to the subsequent stage, together with performing the preparatory operation for time synchronization. Upon completion of the preparatory operation, the slave device 14b transmits preparation completion data to the master device 12 in the communication mode. The preparation completion data, which is transmitted by the slave device 14b to the master device 12, is transmitted to the master device 12 via the slave device 14a.

Upon receiving the preparation request data from the slave device 14b, the final stage slave device 14c performs the preparatory operation for time synchronization. Upon completion of the preparatory operation, the slave device 14c transmits preparation completion data to the master device 12 in the communication mode. The preparation completion data, which is transmitted by the slave device 14c to the master device 12, is transmitted to the master device 12 via the slave device 14b and the slave device 14a.

Upon receiving the preparation completion data from all of the slave devices 14, the master device 12 transitions to the time synchronization operation, which will be described below.

<Time Synchronization Operation>

Figure 3:
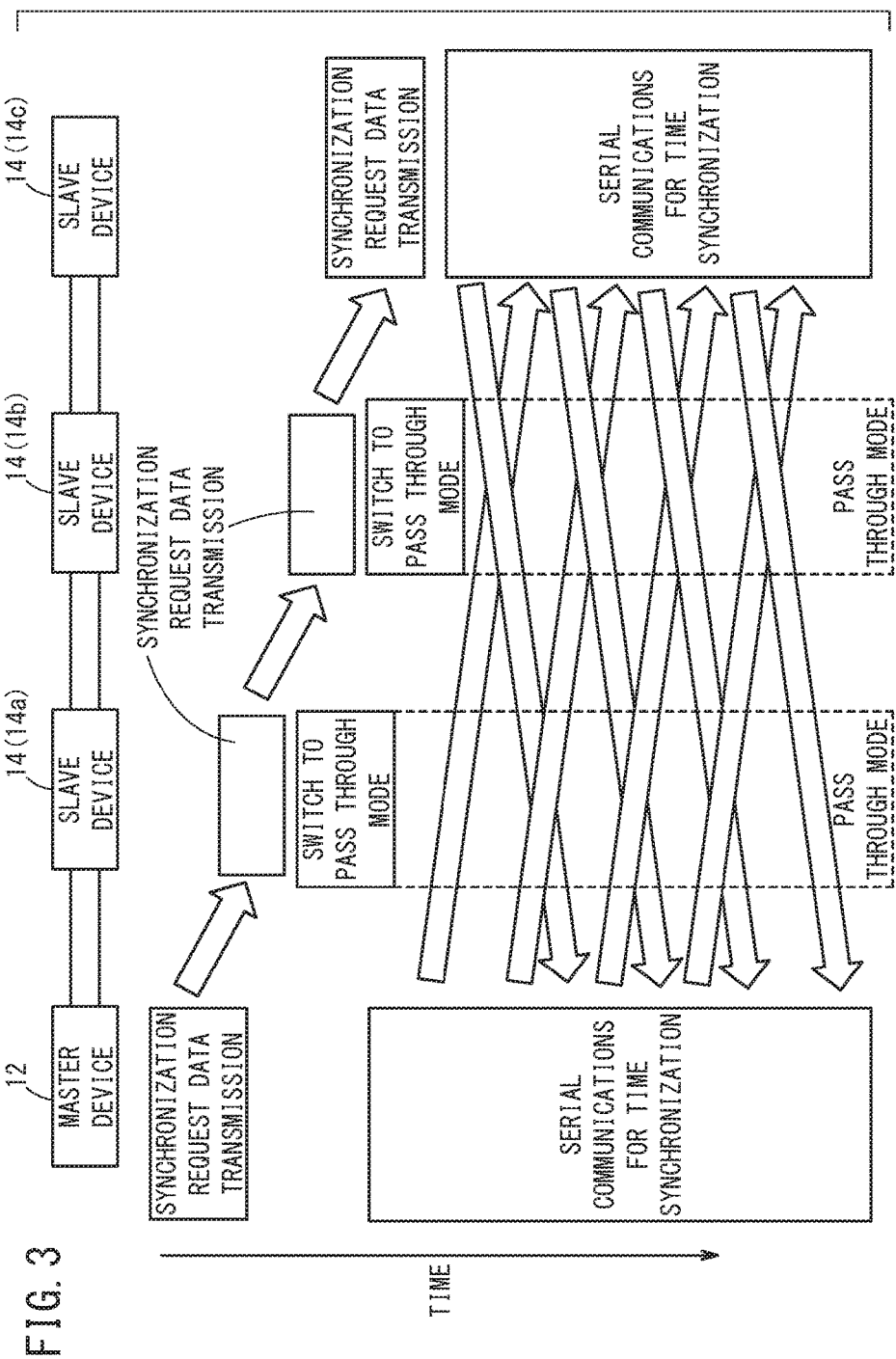
FIG. 3 is a time chart showing a time synchronization operation between a master device and a synchronization target slave device.

Using the time chart shown in FIG. 3, a description will be given of the time synchronization operation between the master device 12 and the synchronization target slave device 14S. The master device 12 transmits synchronization request data in which time synchronization is requested, to the slave device 14a connected to the subsequent stage. The synchronization request data includes request information for requesting time synchronization, and slave device information indicating the slave device 14 for which time synchronization is desired. Upon transmitting the synchronization request data, the master device 12 initiates serial communications (serial communications based on IEEE 1588) for the purpose of time synchronization. The master device 12 repeatedly carries out serial communications for the purpose of time synchronization until the time synchronization is completed. The master device 12 may initiate the serial communications for the purpose of time synchronization immediately after transmitting the synchronization request data, or may initiate the serial communications for the purpose of time synchronization after a predetermined time period has elapsed from transmission of the synchronization request data.

In the description presented below, a description will be made with the assumption that the master device 12 transmits synchronization request data which includes slave device information therein indicating the slave device 14c. In other words, the description is made with the assumption that the slave device 14c is selected as the synchronization target slave device 14S.

The slave device 14a determines whether or not the slave device information contained within the received synchronization request data is information indicating a slave device 14 other than itself. In other words, on the basis of the slave device information, the slave device 14a determines whether the slave device 14a itself is the synchronization target slave device 14S. If it is determined that the slave device 14a itself is not the synchronization target slave device 14S, then using the communication mode, the slave device 14a transmits the received synchronization request data to the slave device 14b connected to the subsequent stage, and thereafter, the slave device 14a switches from the communication mode to the pass through mode. Such switching is carried out by the control unit 28 controlling the switching unit 26 (the first switching unit 26a and the second switching unit 26b). Consequently, a condition is brought about in which the data transmitted from the master device 12 is output to the first communications line 24a of the slave device 14a, and the data transmitted from the slave device 14b is output to the second communications line 24b of the slave device 14a. Moreover, the content of the received data is detected by the control unit 28.

When the synchronization request data is received from the slave device 14a, the slave device 14b determines whether or not the slave device information contained within the synchronization request data is information indicating a slave device 14 other than itself. In other words, on the basis of the slave device information, the slave device 14b determines whether the slave device 14b itself is the synchronization target slave device 14S. If it is determined that the slave device 14b itself is not the synchronization target slave device 14S, then using the communication mode, the slave device 14b transmits the received synchronization request data to the slave device 14c connected to the subsequent stage, and thereafter, the slave device 14b switches from the communication mode to the pass through mode. Consequently, a condition is brought about in which the data transmitted from the slave device 14a is output to the first communications line 24a of the slave device 14b, and the data transmitted from the slave device 14c is output to the second communications line 24b of the slave device 14b.

When the synchronization request data is received from the slave device 14b, the final stage slave device 14c determines whether or not the slave device information contained within the synchronization request data is information indicating a slave device 14 other than itself. In other words, on the basis of the slave device information, the slave device 14c determines whether the slave device 14c itself is the synchronization target slave device 14S. When the slave device 14c determines that the slave device 14c itself is the synchronization target slave device 14S, then using the communication mode, the slave device 14c initiates serial communications for the purpose of time synchronization (serial communications based on IEEE 1588). The slave device 14c repeatedly carries out serial communications for the purpose of time synchronization until the time synchronization is completed. At this time, the slave devices 14a and 14b that are interposed between the master device 12 and the slave device 14c carry out serial communications in the pass through mode. Consequently, the master device 12 and the slave device 14c are able to carry out serial communications for the purpose of time synchronization under a condition which is substantially the same as that in which the slave devices 14a, 14b are not interposed therebetween.

Regardless of whether the slave device information contained within the synchronization request data is information indicating a slave device 14 other than itself or is information indicating the slave device 14 itself, the slave device 14 may transmit the received synchronization request data to the slave device 14 connected to the subsequent stage using the communication mode. In this case, even if the slave device information is information indicating a slave device 14 other than itself, then in the case of being connected to the subsequent stage of the slave device 14 which itself is specified by the slave device information, that is, the synchronization target slave device 14S, there is no particular need for the slave device 14 to switch from the communication mode to the pass through mode.

When time synchronization with the synchronization target slave device 14S is completed, the master device 12 shifts to the return operation, which will be described below.

<Return Operation>

Figure 4:
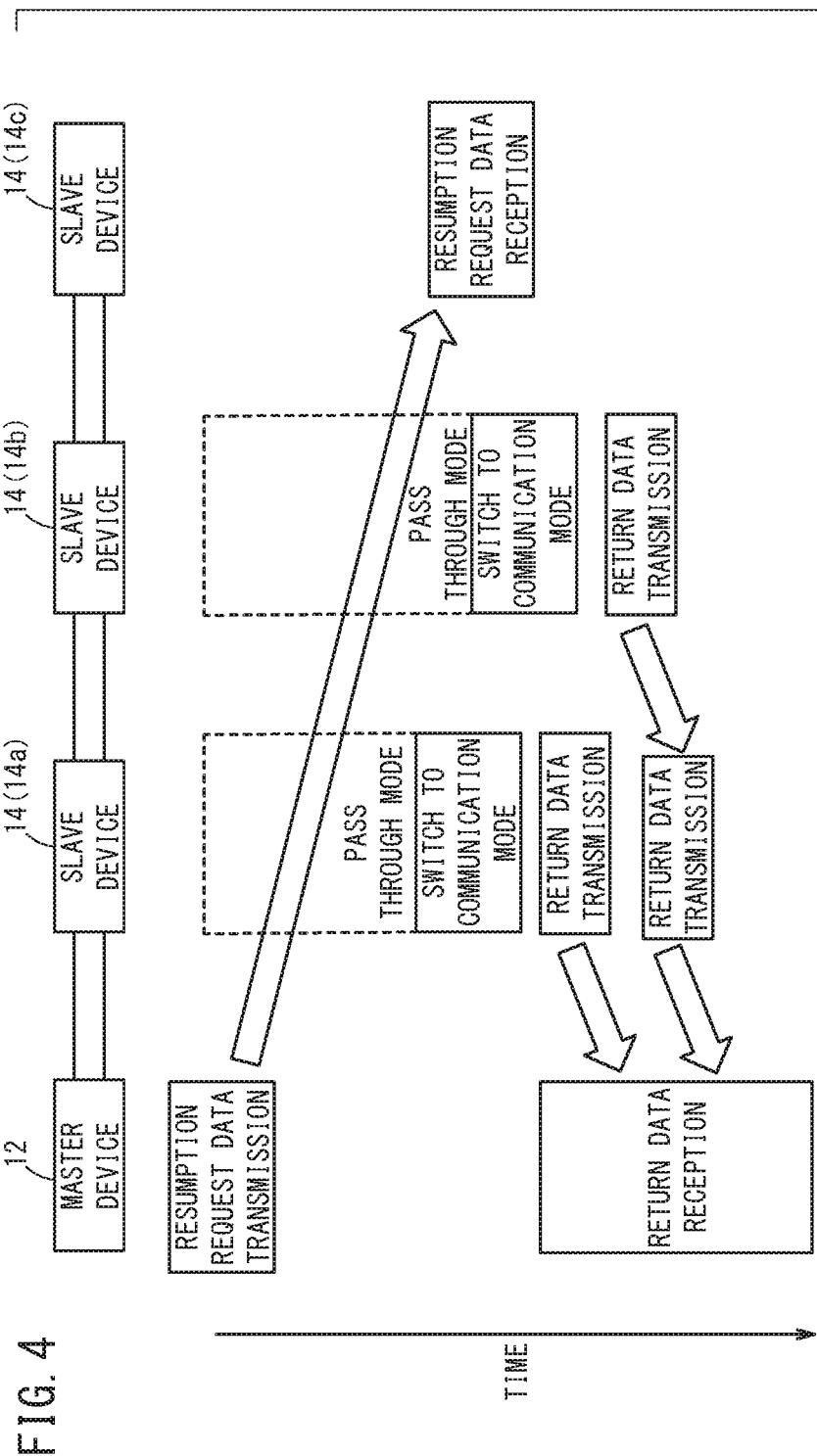
FIG. 4 is a time chart showing a return operation by which slave devices, which have been set in a pass through mode, are returned to a communication mode.

Using the time chart shown in FIG. 4, a description will be given of the return operation by which the slave devices 14, which have been set in the pass through mode, are returned to the communication mode. The master device 12 transmits, to the slave device 14a connected to the subsequent stage, resumption request data in which resumption of the communication mode is requested. The slave devices 14a, 14b are set in the pass through mode, and therefore, the resumption request data is transmitted to the slave device 14c via the first communications line 24a of the slave devices 14a, 14b, and the resumption request data is received by the slave device 14c. At this time, the slave devices 14a, 14b detect the content of the data transmitted from the preceding stage via the first signal line 16a, and in the case that the data is the resumption request data, switching is carried out from the pass through mode to the communication mode. Detection of the data content, and the control to switch from the pass through mode to the communication mode, etc., are performed by the control unit 28.

When the slave devices 14a, 14b are switched from the pass through mode to the communication mode, then using the communication mode, the slave devices 14a, 14b transmit to the master device 12 return data indicating that the slave devices 14a, 14b have been returned to the communication mode. The return data, which is transmitted by the slave device 14b to the master device 12, is transmitted to the master device 12 via the slave device 14a. The control to transmit the return data is performed by the control unit 28.

Upon receiving the return data from all of the slave devices 14a, 14b that were switched to the pass through mode, the master device 12 carries out normal serial communications.

Next, the operations of the master device 12 and the operations of the slave devices 14 will be described with reference to the flowcharts shown in FIGS. 5 and 6. First, operations of the master device 12 will be described with reference to FIG. 5, and thereafter, operations of the slave devices 14 will be described with reference to FIG. 6.

<Operations of the Master Device 12>

Figure 5:
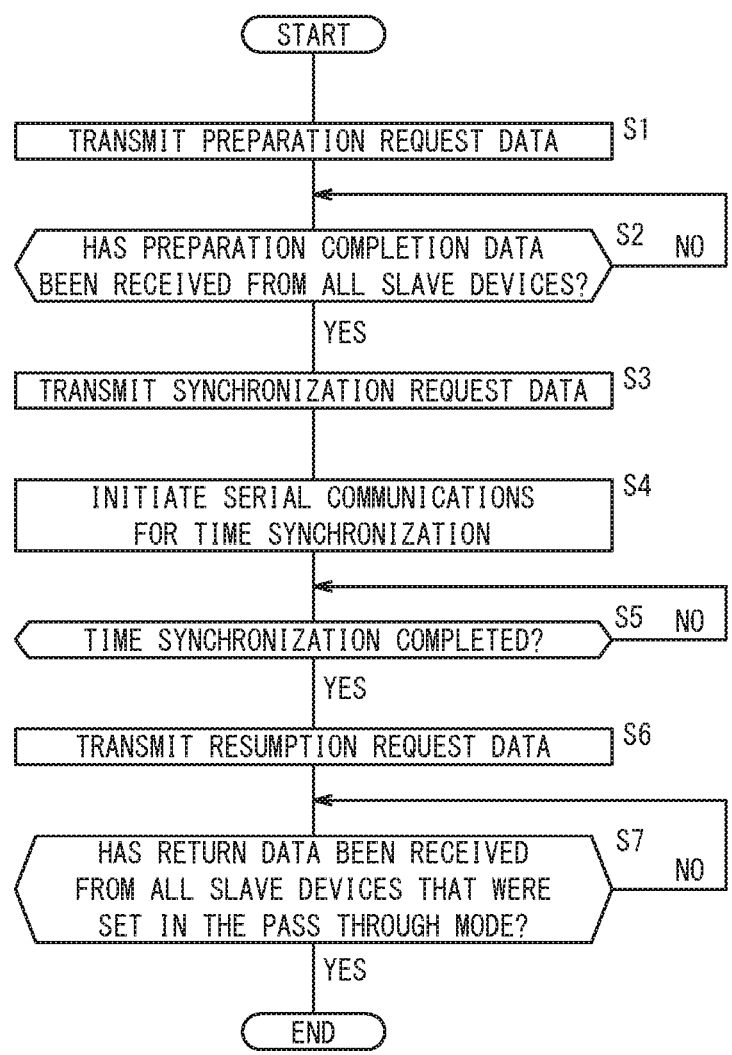
FIG. 5 is a flowchart showing operations of the master device.

In step S1 of FIG. 5, the master device 12 transmits preparation request data to request preparation for time synchronization to the slave device 14a connected to the subsequent stage. Next, in step S2, the master device 12 determines whether or not the preparation completion data transmitted from all of the slave devices 14 (14a to 14c) has been received. In other words, in step S2, it is determined whether or not all of the slave devices 14 have transmitted the preparation completion data.

If it is determined in step S2 that the preparation completion data from all of the slave devices 14 has not been received, the process remains at step S2. If it is determined that the preparation completion data from all of the slave devices 14 has been received, the process proceeds to step S3.

Proceeding to step S3, the master device 12 transmits the synchronization request data for requesting time synchronization. Consequently, the slave devices 14 (for example, the slave devices 14a, 14b), which are interposed between the master device 12 and the synchronization target slave device 14S (for example, the slave device 14c) specified by the slave device information contained within the synchronization request data, are set in the pass through mode.

Next, in step S4, the master device 12 initiates serial communications for the purpose of time synchronization with the synchronization target slave device 14S. Additionally, in step S5, the master device 12 determines whether or not time synchronization with the synchronization target slave device 14S has been completed.

If it is determined in step S5 that time synchronization is not completed, the process remains at step S5, whereas if it is determined that time synchronization has been completed, the process proceeds to step S6. The master device 12 repeatedly carries out serial communications for the purpose of time synchronization until the time synchronization is completed.

Proceeding to step S6, the master device 12 transmits to the slave device 14a connected to the subsequent stage resumption request data in which resumption of the communication mode is requested. Consequently, the slave devices 14 (for example, the slave devices 14a, 14b) that are currently set in the pass through mode are set in the communication mode.

Next, in step S7, the master device 12 determines whether or not return data, which is transmitted from all of the slave devices 14 (for example, the slave devices 14a, 14b) that were set in the pass through mode by operation of step S3, has been received. In other words, in step S7, a determination is made as to whether or not all of the slave devices 14 that were set in the pass through mode have transmitted the return data.

If it is determined in step S7 that the return data has not been received from all of the slave devices 14 that were set in the pass through mode, the process remains at step S7, whereas if it is determined that the return data has been received from all of the slave devices 14 that were set in the pass through mode, the present operation is brought to an end. Upon completion of the present operation, the master device 12 carries out normal serial communications.

<Operations of the Slave Devices 14>

Figure 6:
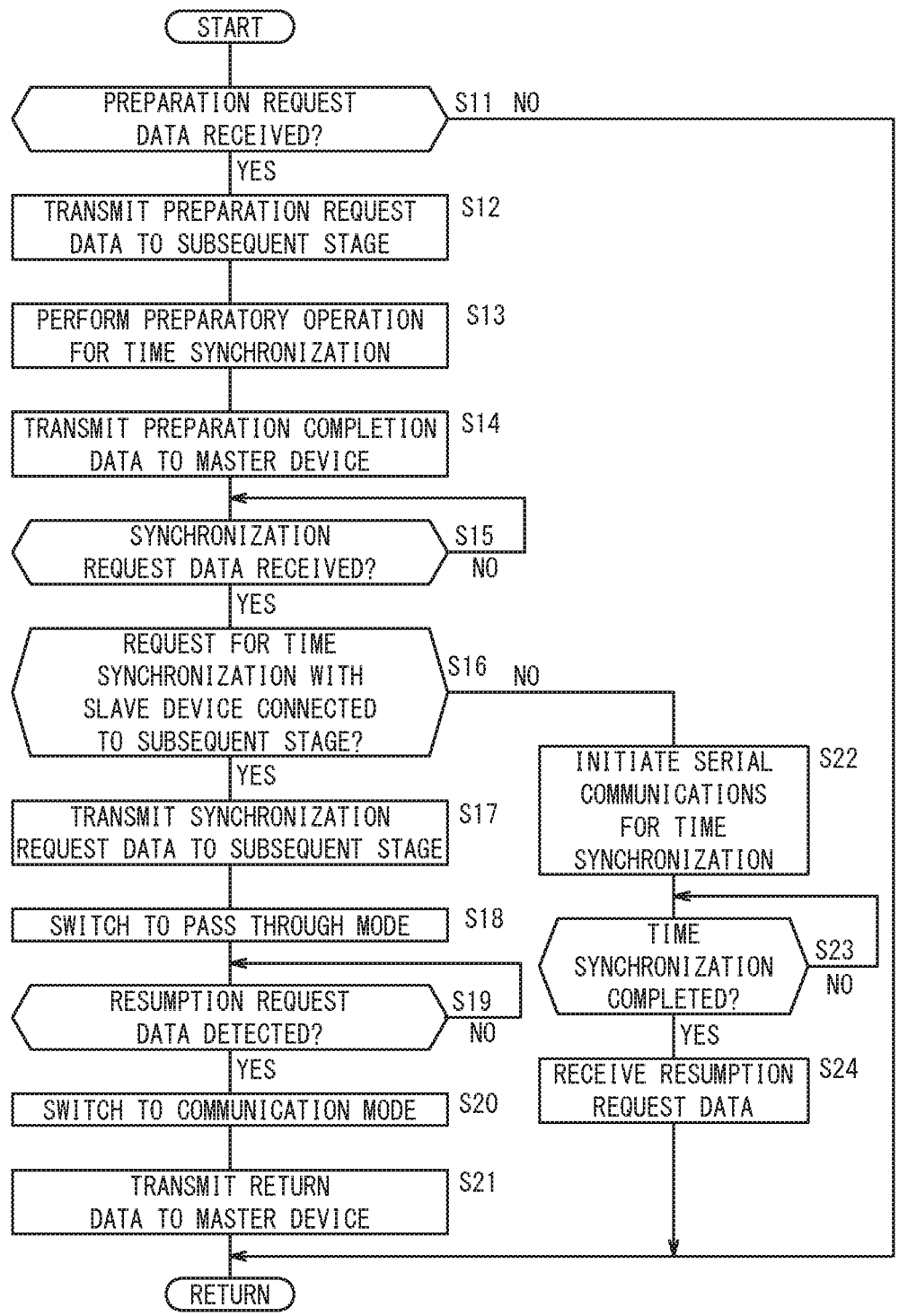
FIG. 6 is a flowchart showing operations of the slave devices.

In step S11 of FIG. 6, the slave device 14 determines whether or not preparation request data has been received. In other words, in step S11, it is determined whether or not the preparation request data has been transmitted from the master device 12 or the slave device 14 connected to the preceding stage. Such a determination is performed by the control unit 28. If it is determined in step S11 that the preparation request data has not been received, the process remains at step S11, whereas if it is determined that the preparation request data has been received, the process proceeds to step S12.

Proceeding to step S12, using the communication mode, the slave device 14 transmits the received preparation request data to the slave device 14 connected to the subsequent stage, and in step S13, the slave device 14 performs a preparatory operation for time synchronization. The preparatory operation for time synchronization refers to transmitting the specified unit of data, which is currently being carried out by the slave device 14.

Upon completion of the preparatory operation, or in other words, when transmission of the specified unit of data currently being carried out by the slave device 14 is completed, then in step S14, the slave device 14 transmits the preparation completion data to the master device 12 in the communication mode. Transmission of the preparation completion data is performed by the control unit 28. At this time, when the preparation completion data is transmitted thereto from the slave device 14 connected to the subsequent stage, the slave device 14 also transmits the preparation completion data to the master device 12.

Next, in step S15, the slave device 14 determines whether or not the synchronization request data has been received. In other words, in step S15, it is determined whether or not synchronization request data has been transmitted from the master device 12 or the slave device 14 connected to the preceding stage. Such a determination is performed by the control unit 28. If it is determined in step S15 that the synchronization request data has not been received, the process remains at step S15, whereas if it is determined that the synchronization request data has been received, the process proceeds to step S16.

Proceeding to step S16, on the basis of the slave device information contained within the synchronization request data, the slave device 14 determines whether or not the master device 12 is requesting time synchronization with the slave device 14 connected to the subsequent stage. Such a determination is performed by the control unit 28.

If it is determined in step S16 that the master device 12 is requesting time synchronization with the slave device 14 connected to the subsequent stage, then in step S17, using the communication mode, the slave device 14 transmits the received synchronization request data to the slave device 14 connected to the subsequent stage.

Next, in step S18, the slave device 14 switches from the communication mode to the pass through mode. Such switching is carried out by the control unit 28 controlling the switching unit 26.

Next, in step S19, the slave device 14 determines whether or not the resumption request data has been detected. In other words, a determination is made as to whether or not the resumption request data has been transmitted from the master device 12. Detection of the resumption request data is performed by the control unit 28.

If it is determined in step S19 that the resumption request data has not been detected, the process remains at step S19 until detection of the resumption request data, whereas if it is determined that the resumption request data has been detected, the process proceeds to step S20.

Proceeding to step S20, the slave device 14 switches from the pass through mode to the communication mode. Such switching is carried out by the control unit 28 controlling the switching unit 26.

Next, in step S21, the slave device 14 transmits the return data to the master device 12 in the communication mode. Transmission of the return data is performed by the control unit 28. At this time, in the case that the return data is transmitted thereto from the slave device 14 connected to the subsequent stage, the slave device 14 also transmits the return data to the master device 12, and then the process returns to step S11.

On the other hand, if it is determined in step S16 that the master device 12 has not requested time synchronization with the slave device 14 connected to the subsequent stage, or in other words, if it is determined that time synchronization is requested with itself, the process proceeds to step S22.

Proceeding to step S22, the slave device 14 initiates serial communications for the purpose of time synchronization with the master device 12. Such serial communications are performed under the control of the control unit 28. At this time, any other slave devices 14 interposed between the master device 12 and the slave device 14 itself are set in the pass through mode.

Additionally, in step S23, the slave device 14 determines whether or not time synchronization with the master device 12 has been completed. If it is determined in step S23 that time synchronization is not completed, the process remains at step S23, whereas if it is determined that time synchronization has been completed, the process proceeds to step S24. The slave device 14 repeatedly carries out serial communications for the purpose of time synchronization until the time synchronization is completed.

Proceeding to step S24, the slave device 14 receives the resumption request data transmitted from the master device 12, whereupon the process returns to step S11.

Technical Concepts Obtained from the Embodiments

The technical concepts that can be grasped from the above embodiments will be described below.

First Technical Concept

A slave device (14) is connected in a daisy chain fashion with a master device (12), and is equipped with a communications circuit (22) configured to carry out serial communications in a communication mode in which received data is transmitted in synchronism with its own clock pulse signal, the slave device (14) further comprising a communications line (24) configured to carry out serial communications in a pass through mode in which the received data is directly transmitted without depending on its own clock pulse signal, a switching unit (26) configured to switch from the communication mode to the pass through mode, and a control unit (28) configured to control the switching unit (26).

Consequently, it is possible to set the slave devices (14), which are interposed between the master device (12) and the slave device (14) for which time synchronization with the master device (12) is carried out, in the pass through mode. In accordance with this feature, the intervening slave devices (14) assume a state of being substantially non-existent, and thus errors due to the intervening slave devices (14) are not accumulated. Consequently, it is possible to reduce phase difference errors that are generated when time synchronization is carried out, as well as to perform the time synchronization control with high accuracy.

In the case that the received data from the master device (12) is synchronization request data for requesting time synchronization with a slave device (14) other than itself, then after having transmitted in the communication mode the synchronization request data received by the slave device (14) itself, the control unit (28) may control the switching unit (26) to switch from the communication mode to the pass through mode.

In accordance with this feature, even if one or a plurality of slave devices (14) are interposed between the master device (12) and the slave device (14) for which time synchronization with the master device (12) is carried out, a state is brought about which is substantially the same as a state in which the slave devices (14) are not interposed therebetween, and therefore, errors are not accumulated. Consequently, it is possible to reduce phase difference errors that are generated when time synchronization is carried out, as well as to perform the time synchronization control with high accuracy.

In the case that the data received from the master device (12) is synchronization request data for requesting time synchronization with the slave device (14) itself, the control unit (28) may carry out serial communications in the communication mode with the master device (12) for the purpose of time synchronization.

In accordance with this feature, even if one or a plurality of slave devices (14) are interposed between the master device (12) and the slave device (14) itself, a state is brought about which is substantially the same as a state in which the slave devices (14) are not interposed therebetween, and therefore, errors are not accumulated. Consequently, it is possible to reduce phase difference errors that are generated when time synchronization is carried out, as well as to perform the time synchronization control with high accuracy.

In the case that the data received from the master device (12) is preparation request data transmitted prior to transmission of the synchronization request data and which requests preparation for time synchronization, the control unit (28) may transmit in the communication mode the preparation request data received by the slave device (14) itself, and when serial communications of a specified unit of data currently being carried out by the slave device (14) itself are completed, the control unit (28) may transmit preparation completion data to the master device (12).

In accordance with this feature, during switching from the communication mode to the pass through mode, it is possible to prevent the serial communications currently being carried out by the slave device (14) from being interrupted. Further, the master device (12) is capable of recognizing whether the preparatory operation of the slave device for time synchronization has been completed, and thus can transmit the synchronization request data at an appropriate timing.

In the case that the data received from the master device (12) is resumption request data for requesting resumption of the communication mode, and the slave device (14) itself is in the pass through mode, the control unit (28) may control the switching unit (26) to switch to the communication mode, and thereafter, may transmit to the master device (12) return data indicating that communications in the communication mode are possible. Owing to this feature, when time synchronization is completed, the slave devices (14) that had been switched to the pass through mode are returned to the communication mode, and therefore, normal serial communications can be carried out. Further, the master device (12) is capable of recognizing whether the slave devices (14) have been returned to the communication mode, and can resume normal serial communications at an appropriate timing.

In the case that the received data is data transmitted from the master device (12) or from the slave device (14) connected to the preceding stage, the communications circuit (22) and the communications line (24) may transmit the received data to the slave device (14) connected to the subsequent stage, whereas in the case that the received data is data transmitted from the slave device (14) connected to the subsequent stage, the communications circuit (22) and the communications line (24) may transmit the received data to the master device (12) or the slave device (14) connected to the preceding stage.

Second Technical Concept

The serial communications system (10) comprises the master device (12), and a plurality of slave devices (14) connected to the master device (12) in a daisy chain fashion. The master device (12) transmits to the slave device (14) connected to the subsequent stage synchronization request data including request information for requesting time synchronization, and slave device information indicating the slave device (14) for which time synchronization is desired. The slave device (14) is equipped with the communications circuit (22) that carries out serial communications in a communication mode in which received data is transmitted in synchronism with its own clock pulse signal, the communications line (24) that carries out serial communications in a pass through mode in which received data is directly transmitted without depending on its own clock pulse signal, the switching unit (26) that switches from the communication mode to the pass through mode, and the control unit (28) that controls the switching unit (26). In the case that the received data from the master device (12) is synchronization request data, and the slave device information contained within the synchronization request data indicates a slave device (14) other than itself, then after having transmitted the received synchronization request data in the communication mode, the control unit (28) controls the switching unit (26) to switch from the communication mode to the pass through mode.

In accordance with this feature, even if one or a plurality of slave devices (14) are interposed between the master device (12) and the slave device (14) for which time synchronization with the master device (12) is carried out, a state is brought about which is substantially the same as a state in which the slave devices (14) are not interposed therebetween, and therefore, errors are not accumulated. Consequently, it is possible to reduce phase difference errors that are generated when time synchronization is carried out, as well as to perform the time synchronization control with high accuracy.

In the case that the received data from the master device (12) is the synchronization request data, and the slave device information contained within the synchronization request data indicates the slave device (14) itself, the control unit (28) may carry out serial communications in the communication mode with the master device (12) for the purpose of time synchronization.

In accordance with this feature, even if one or a plurality of slave devices (14) are interposed between the master device (12) and the slave device (14) itself, a state is brought about which is substantially the same as a state in which the slave devices (14) are not interposed therebetween, and therefore, errors are not accumulated. Consequently, it is possible to reduce phase difference errors that are generated when time synchronization is carried out, as well as to perform the time synchronization control with high accuracy.

Before the synchronization request data is transmitted to the slave device (14) connected to the subsequent stage, the master device (12) may transmit preparation request data for requesting preparation for time synchronization. In the case that the data received from the master device (12) is the preparation request data, the control unit (28) may transmit in the communication mode the preparation request data received by the slave device (14) itself, and when serial communications of a specified unit of data currently being carried out by the slave device (14) itself are completed, the control unit (28) may transmit preparation completion data to the master device (12). When the preparation completion data is transmitted thereto from the plurality of slave devices (14), the master device (12) may transmit the synchronization request data to the slave device (14) connected to the subsequent stage.

In accordance with this feature, during switching from the communication mode to the pass through mode, it is possible to prevent the serial communications currently being carried out by the slave device (14) from being interrupted. Further, the master device (12) is capable of recognizing whether the preparatory operation of the slave device (14) for time synchronization has been completed, and thus can transmit the synchronization request data at an appropriate timing.

When time synchronization is completed, the master device (12) may transmit, to the slave device (14) connected to the subsequent stage, resumption request data for requesting resumption of the communication mode. In the case that the data received from the master device (12) is the resumption request data, and the slave device (14) itself is in the pass through mode, the control unit (28) may control the switching unit (26) to switch to the communication mode, and thereafter, may transmit to the master device (12) return data indicating that communications in the communication mode are possible.

Owing to this feature, when time synchronization is completed, the slave devices (14) that had been switched to the pass through mode are returned to the communication mode, and therefore, normal serial communications can be carried out. Further, the master device (12) is capable of recognizing whether the slave devices (14) have been returned to the communication mode, and can resume normal serial communications at an appropriate timing.

While the invention has been particularly shown and described with reference to preferred embodiments, it will be understood that variations and modifications can be effected thereto by those skilled in the art without departing from the scope of the invention as defined by the appended claims.

What is claimed is:

1. A slave device connected in a daisy chain fashion with a master device, and which is equipped with a communications circuit configured to carry out serial communications in a communication mode in which received data is transmitted in synchronism with its own clock pulse signal, the slave device further comprising:
   a communications line configured to carry out serial communications in a pass through mode in which the received data is directly transmitted without depending on its own clock pulse signal;
   a switching unit configured to switch from the communication mode to the pass through mode; and
   a control unit configured to control the switching unit,
   wherein, in a case that the received data from the master device is synchronization request data configured to request time synchronization with a slave device other than itself, then after having transmitted in the communication mode the synchronization request data received by the slave device itself, the control unit controls the switching unit to switch from the communication mode to the pass through mode.

2. The slave device according to claim 1, wherein, in a case that the received data from the master device is synchronization request data configured to request time synchronization with the slave device itself, the control unit carries out serial communications in the communication mode with the master device for a purpose of time synchronization.

3. The slave device according to claim 1, wherein, in a case that the received data from the master device is preparation request data transmitted prior to transmission of the synchronization request data and which is configured to request preparation for time synchronization, the control unit transmits in the communication mode the preparation request data received by the slave device itself, and when serial communications of a specified unit of data currently being carried out by the slave device itself are completed, the control unit transmits preparation completion data to the master device.

4. The slave device according to claim 1, wherein, in a case that the received data from the master device is resumption request data configured to request resumption of the communication mode, and the slave device itself is in the pass through mode, the control unit controls the switching unit to switch to the communication mode, and thereafter, transmits to the master device return data indicating that communications in the communication mode are possible.

5. The slave device according to claim 1, wherein, in a case that the received data is data transmitted from the master device or the slave device connected to a preceding stage, the communications circuit and the communications line transmit the received data to the slave device connected to a subsequent stage, whereas in a case that the received data is data transmitted from the slave device connected to the subsequent stage, the communications circuit and the communications line transmit the received data to the master device or the slave device connected to the preceding stage.

6. A serial communications system equipped with a master device and a plurality of slave devices connected in a daisy chain fashion with the master device, wherein:
   the master device transmits, to a slave device that is connected to a subsequent stage, synchronization request data including request information configured to request time synchronization, and slave device information indicating a slave device for which time synchronization is desired;

each of the slave devices comprises:
a communications circuit configured to carry out serial communications in a communication mode in which received data is transmitted in synchronism with its own clock pulse signal;
a communications line configured to carry out serial communications in a pass through mode in which the received data is directly transmitted without depending on its own clock pulse signal;
a switching unit configured to switch from the communication mode to the pass through mode; and
a control unit configured to control the switching unit;
wherein, in a case that the received data from the master device is the synchronization request data, and the slave device information contained within the synchronization request data indicates a slave device other than itself, the control unit, after having transmitted the received synchronization request data in the communication mode, controls the switching unit to switch from the communication mode to the pass through mode.

7. The serial communications system according to claim 6, wherein, in a case that the received data from the master device is the synchronization request data, and the slave device information contained within the synchronization request data indicates the slave device itself, the control unit carries out serial communications in the communication mode with the master device for a purpose of time synchronization.

8. The serial communications system according to claim 6, wherein:
the master device transmits preparation request data configured to request preparation for time synchronization, prior to transmitting the synchronization request data to the slave device connected to the subsequent stage;
in a case that the received data from the master device is the preparation request data, the control unit transmits in the communication mode the preparation request data received by the slave device itself, and when serial communications of a specified unit of data currently being carried out by the slave device itself are completed, the control unit transmits preparation completion data to the master device; and
when the preparation completion data is transmitted thereto from the plurality of slave devices, the master device transmits the synchronization request data to the slave device connected to the subsequent stage.

9. The serial communications system according to claim 6, wherein:
when the time synchronization is completed, the master device transmits, to the slave device connected to the subsequent stage, resumption request data configured to request resumption of the communication mode; and
in a case that the received data from the master device is the resumption request data, and the slave device itself is in the pass through mode, the control unit controls the switching unit to switch to the communication mode, and thereafter, transmits to the master device return data indicating that communications in the communication mode are possible.

10. The serial communications system according to claim 6, wherein, in a case that the received data is data transmitted from the master device or the slave device connected to a preceding stage, the communications circuit and the communications line transmit the received data to the slave device connected to the subsequent stage, whereas in a case that the received data is data transmitted from the slave device connected to the subsequent stage, the communications circuit and the communications line transmit the received data to the master device or the slave device connected to the preceding stage.

11. A communication method for a serial communications system equipped with a master device and a plurality of slave devices connected in a daisy chain fashion with the master device, wherein:
each of the slave devices comprises:
a communications circuit configured to carry out serial communications in a communication mode in which received data is transmitted in synchronism with its own clock pulse signal;
a communications line configured to carry out serial communications in a pass through mode in which the received data is directly transmitted without depending on its own clock pulse signal; and
a switching unit configured to switch from the communication mode to the pass through mode;
the communication method comprising:
a synchronization requesting step in which the master device transmits, to a slave device that is connected to a subsequent stage, synchronization request data including request information configured to request time synchronization, and slave device information indicating a slave device for which time synchronization is desired; and
a pass through step in which, in a case that the received data from the master device is the synchronization request data, and the slave device information contained within the synchronization request data indicates a slave device other than itself, the slave device, after having transmitted the received synchronization request data in the communication mode, controls the switching unit to switch from the communication mode to the pass through mode.

12. The communication method for the serial communications system according to claim 11, further comprising a synchronization step in which, in a case that the received data from the master device is the synchronization request data, and the slave device information contained within the synchronization request data indicates the slave device itself, the slave device carries out serial communications in the communication mode with the master device for a purpose of time synchronization.

13. The communication method for the serial communications system according to claim 11, further comprising:
a preparation requesting step in which the master device transmits preparation request data configured to request preparation for time synchronization, prior to transmitting the synchronization request data to the slave device connected to the subsequent stage; and
a preparatory step in which, in a case that the received data from the master device is the preparation request data, the slave device transmits in the communication mode the preparation request data received by the slave device itself, and when serial communications of a specified unit of data currently being carried out by the slave device itself are completed, the slave device transmits preparation completion data to the master device, wherein
in the synchronization requesting step, when the preparation completion data is transmitted thereto from the plurality of slave devices, the master device transmits the synchronization request data to the slave device connected to the subsequent stage.

14. The communication method for the serial communications system according to claim 11, further comprising:
a resumption requesting step in which, when the time synchronization is completed, the master device transmits, to the slave device connected to the subsequent stage, resumption request data configured to request resumption of the communication mode; and
a return completion step in which, in a case that the received data from the master device is the resumption request data, and the slave device itself is in the pass through mode, the slave device controls the switching unit to switch to the communication mode, and thereafter, transmits to the master device return data indicating that communications in the communication mode are possible.

* * * * *